US010132297B2

(12) United States Patent
Garcia

(10) Patent No.: US 10,132,297 B2
(45) Date of Patent: Nov. 20, 2018

(54) BASIC GRID SUPERVISION OF A WIND POWER PLANT

(71) Applicant: VESTAS WIND SYSTEMS A/S, Aarhus N (DK)

(72) Inventor: Jorge Martinez Garcia, Aarhus N (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 160 days.

(21) Appl. No.: 15/039,386

(22) PCT Filed: Oct. 30, 2014

(86) PCT No.: PCT/DK2014/050355
§ 371 (c)(1),
(2) Date: May 25, 2016

(87) PCT Pub. No.: WO2015/078470
PCT Pub. Date: Jun. 4, 2015

(65) Prior Publication Data
US 2017/0022977 A1 Jan. 26, 2017

(30) Foreign Application Priority Data
Nov. 28, 2013 (DK) .................... 2013 70727

(51) Int. Cl.
| | |
|---|---|
| G05D 7/00 | (2006.01) |
| F03D 17/00 | (2016.01) |
| F03D 7/02 | (2006.01) |
| F03D 7/04 | (2006.01) |
| H02J 3/38 | (2006.01) |
| H02J 3/18 | (2006.01) |

(Continued)

(52) U.S. Cl.
CPC .......... F03D 17/00 (2016.05); F03D 7/0284 (2013.01); F03D 7/048 (2013.01);
(Continued)

(58) Field of Classification Search
CPC ........ F03D 17/00; F03D 7/0284; F03D 7/048; G05B 19/0428; G05B 2219/2619;
(Continued)

(56) References Cited

U.S. PATENT DOCUMENTS

| | | |
|---|---|---|
| 2010/0094474 A1 | 4/2010 | Larsen et al. |
| 2010/0207463 A1 | 8/2010 | Fortmann et al. |

(Continued)

FOREIGN PATENT DOCUMENTS

EP 1467463 A1 10/2004

OTHER PUBLICATIONS

International Search Report for PCK/DK2014/050355, dated Jan. 23, 2015.
Danish Search Report for PA 2013 70727, dated Jul. 11, 2014.

Primary Examiner — Fernando Hidalgo
(74) Attorney, Agent, or Firm — Patterson + Sheridan, LLP

(57) ABSTRACT

The present invention relates to a method for supervision of an electrical measurement in a wind power plant, with a plurality of wind turbine generators, the method comprises, a) measuring a measurement of an electrical parameter in the wind power plant, b) determining a difference between the measurement and a reference value, c) in case the difference is greater than a threshold value, incrementing an event counter, d) in case the event counter is incremented, raising a first warning flag. The invention also relates to a power plant controller arranged to supervise a wind power plant according to the method; the wind power plant comprises a plurality of wind turbine generators.

19 Claims, 4 Drawing Sheets

(51) Int. Cl.
G05B 19/042 (2006.01)
H02J 3/16 (2006.01)
(52) U.S. Cl.
CPC ............ *G05B 19/0428* (2013.01); *H02J 3/16* (2013.01); *H02J 3/18* (2013.01); *H02J 3/386* (2013.01); *F05B 2220/706* (2013.01); *F05B 2270/337* (2013.01); *G05B 2219/2619* (2013.01); *Y02E 10/723* (2013.01); *Y02E 10/725* (2013.01); *Y02E 10/763* (2013.01); *Y02E 40/30* (2013.01)
(58) Field of Classification Search
CPC ..... H02J 3/16; H02J 3/18; H02J 3/386; F05B 2220/706; F05B 2270/337; Y02E 10/723; Y02E 10/725; Y02E 10/763; Y02E 40/30

USPC ......................................................... 700/287
See application file for complete search history.

(56) References Cited

U.S. PATENT DOCUMENTS

| | | |
|---|---|---|
| 2011/0140428 A1 | 6/2011 | Wakata et al. |
| 2012/0271470 A1 | 10/2012 | Flynn et al. |
| 2012/0310426 A1 | 12/2012 | Tarnowski |
| 2012/0313593 A1* | 12/2012 | Knuppel ............... F03D 7/0284 323/234 |
| 2013/0193933 A1 | 8/2013 | Andresen et al. |
| 2013/0214535 A1 | 8/2013 | Brath |

* cited by examiner

BASIC GRID SUPERVISION OF A WIND POWER PLANT

FIELD OF THE INVENTION

The present invention relates to a method for supervision of an electrical measurement in a wind power plant, with a plurality of wind turbine generators. Further, the present invention relates to a power plant controller of the above-mentioned sort.

BACKGROUND OF THE INVENTION

A wind power plant usually has a plurality of wind turbines for converting wind energy to electricity. To supply electricity to the electricity end users, the wind power plant is connected to a power grid. However, before the wind power plant can be connected to a power grid, the wind power plant has to meet the requirements of electrical performance of the wind power plant specified by grid codes. One requirement is an initial response time of the wind power plant for various parameters such as voltage, frequency, active power and reactive power.

A wind power plant is often referred to as a group of wind turbine generators which are commonly connected to an electrical grid through a common connection point, also known as Point of Common Coupling (PCC). Generally, the wind power plant has a wind power plant controller which monitors a power grid voltage and compares the power grid voltage with an external setpoint. A difference between the actual power grid voltage and the external setpoint (e.g. an error signal) is used to calculate a command for reactive power production for the wind power plant. This command is sent from the wind power plant controller to the individual wind turbines which in turn will respond (e.g. produce more or less power in order to adjust the power grid voltage) upon receiving the command. The error signal may be caused by a change in the actual power grid voltage or a change in the external setpoint. The initial response time of the wind power plant is to be understood as the time period starting upon detection of a change in the power grid voltage or a change in the external setpoint and ending as soon as the first wind turbine of the plurality of wind turbines of the wind power plant responds (as soon as response is detected).

Often the power plant controller operates with some restrictions. These restrictions can be referred back to current or voltage limitations, but in practice the limits are often implemented as a restriction to the reactive power supplied from the wind power plant to the grid through a point of common coupling. This restriction can either be a hard reactive power limit with a numerical value of VAr's or p.u. or a Power Factor value, meaning that the reactive power is limited to an upper maximum defined according to the present active power production.

In classical control theory with feedback loops it has been known to have a reference and compare it with a measurement. The difference between the reference and the measurement, also known as the error is used as the input for a controller. The controller is often a PID, PI or even P controller. Large errors often drives the controller to a less stable situation, as saturation may occur in the integral part of the controller or saturation occurs as maximum or minimum ceilings of the output values can be reached.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

It is an object of the present invention to have a method for avoiding controller saturation in general during normal operation, as large control errors in normal operation should be avoided.

Improving the supervision of the electrical grid whereto the wind power plant is connected ensures a better performance of the wind power plant, as improved control by the power plant controller is one of the benefit of the present invention.

Thus, the above described object and several other objects are intended to be obtained in a first aspect of the invention by providing a method for supervision of an electrical measurement in a wind power plant, with a plurality of wind turbine generators, the method comprising:
a) measuring a measurement of an electrical parameter (311) in the wind power plant,
b) determining a difference between the measurement and a reference value,
c) in case the difference is greater than a threshold value, incrementing an event counter,
d) in case the event counter is incremented, raising a first warning flag.

The invention is particularly, but not exclusively, advantageous because it allows the power plant controller to monitor measurements compared with the reference signals. Setting warnings whenever measurements exceed the threshold value help the power plant controller to supervise the health of the electrical system.

According to one embodiment of the invention the method further comprises:
in case the event counter is incremented, starting an event timer with a predetermined duration of time,
repeating the steps a), b), c) and d) once every predefined sample period of time,
in case the event counter is greater than a predetermined limit value, raising a second warning flag,
resetting the event counter when the event timer expirers.

An advantage of the above embodiment is that the repeating of the steps performs the supervision is discrete manner and thus following the measurement continuously.

According to one embodiment of the invention the method further comprises:
e) determining a sign of the difference,
f) in case the difference is greater than a threshold value and the sign of a previous difference for a previous sample has toggled from negative to positive or from positive to negative, incrementing a flicker counter,
g) in case the flicker counter is incremented, starting a flicker window with a second predetermined duration of time,
h) repeating the steps a) to g) once every predefined sample period of time,
i) in case the flicker counter is greater than a predetermined limit value, raising a flicker warning flag,
j) resetting the flicker counter when the flicker window expirers.

An advantage of this embodiment is that the supervision functions as an effective flicker and/or oscillations monitor.

According to one embodiment of the invention the electrical measurement is a voltage measurement or a reactive power measurement. An advantage of this embodiment is that both the voltage and the reactive power measurements are known to change over time.

According to one embodiment of the invention the measurement is an instantaneous value of the electrical parameter. An advantage of this embodiment is that the supervision can detect fast transients faster than can propagate through the controller, and thereby will the power plant controller earlier be aware of them.

According to one embodiment of the invention the method further comprises: Low pass filtering the measurement of the electrical parameter, so as the measurement is a filtered value of the electrical parameter. An advantage of this embodiment is that the supervision will not see the fast transient and thus it will not disturb the system.

According to one embodiment of the invention the threshold value is selected as combination of a deadband and a margin. An advantage of this embodiment is that the margin allows the measurement some fluctuation and the deadband ensures that fluctuations which can come as a consequence of normal grid function, and thus it is not relevant to highlight an alarm. The user has the capability of setting the amplitude of these normal expected oscillations in the deadband according to the wind plant location.

According to one embodiment of the invention the supervision is temporally disabled in accordance with a predefined event, such as a reference change or a transient in the reference value. An advantage of this embodiment is that the power plant controller is interrupted by events that are known to cause transient behaviour in the measurements.

According to one embodiment of the invention the method further comprises:
determining a delta change in the measurement compared with the measurement of a previous sample,
setting a duration of the temporally disabling of the supervision in accordance with the delta change.

An advantage of this embodiment is that the supervision systems known when the temporally disabling is finished and the system can resume normal operation again.

According to one embodiment of the invention the supervision is disabled in accordance with a predefined event. An advantage of this embodiment is that the power plant controller is interrupted by events that are known to cause transient behaviour in the measurements.

According to one embodiment of the invention the predefined event is a situation where a percentage of the plurality of wind turbine generators in an operating mode is below a predetermined percentage.

In a second aspect, the present invention relates to at least one computer program product directly loadable into the internal memory of at least one digital computer, comprising software code portions for performing the steps of the method according to any of the embodiments herein disclosed, when said at least one product is/are run on said at least one computer.

In a third aspect, the present invention relates to a power plant controller arranged to supervise a wind power plant, the wind power plant comprises a plurality of wind turbine generators, wherein the power plant controller is arranged to:
measure an electrical parameter in the wind power plant,
determine a difference between the measured electrical parameter and a reference value, and
in case the difference is greater than a threshold value, increment an event counter, and
in case the event counter is incremented, raise a first warning flag.

The first, second and third aspect of the present invention may each be combined with any of the other aspects. These and other aspects of the invention will be apparent from and elucidated with reference to the embodiments described hereinafter.

Many of the attendant features will be more readily appreciated as the same become better understood by reference to the following detailed description considered in connection with the accompanying drawings. The preferred features may be combined as appropriate, as would be apparent to a skilled person, and may be combined with any of the aspects of the invention.

DETAILED DESCRIPTION OF THE INVENTION

The present invention will now be explained in further details. While the invention is susceptible to various modifications and alternative forms, specific embodiments have been disclosed by way of examples. It should be understood, however, that the invention is not intended to be limited to the particular forms disclosed. Rather, the invention is to cover all modifications, equivalents, and alternatives falling within the spirit and scope of the invention as defined by the appended claims.

The idea for this present invention is to implement a supervision mechanism for an abnormality at a Point of measurement (PoM) 211 in an electrical system. A PoM is normally always associated with at least one control loop. In an electrical system, such as a wind power plant (WPP) a PoM often relates to an electrical measurement, i.e. voltage(s) and/or current(s), from which many other measures can be derived, such as frequency, active power, reactive power, Power Factor (PF) and many others.

When reactive control (PF, Q, VSC, Vpi) is activated, the reactive power and voltage measurements are monitored in the reactive control loop execution. A warning and eventually an alarm will be raised to the power plant controller for further action if there are deviations from what was expected.

The present invention supervise the measured signals against an expected value, here the expected are following the corresponding controller reference value.

The controller is provided with measurement values from a point of measurement, which values are modified according to estimated values at a point of common coupling, and associated reference values (e.g. $V_{ref}$, $f_{ref}$, $Q_{ref}$ etc.) for the point of measurement.

The embodiments of the present invention pertain to a power plant controller of a wind power system with a plurality of wind turbine generators.

The wind turbine generator which supplies power to an electric grid may be equipped with regulation capacity against voltage level, grid-frequency and active power fluctuations. "Electric grid" or "grid" is a utility grid outside the boundary and point of common coupling of a wind power plant; when reference is made to the grid within a wind power plant an expression with explicit indication to the wind power plant is made, e.g., "wind power plant grid".

Figure 1:
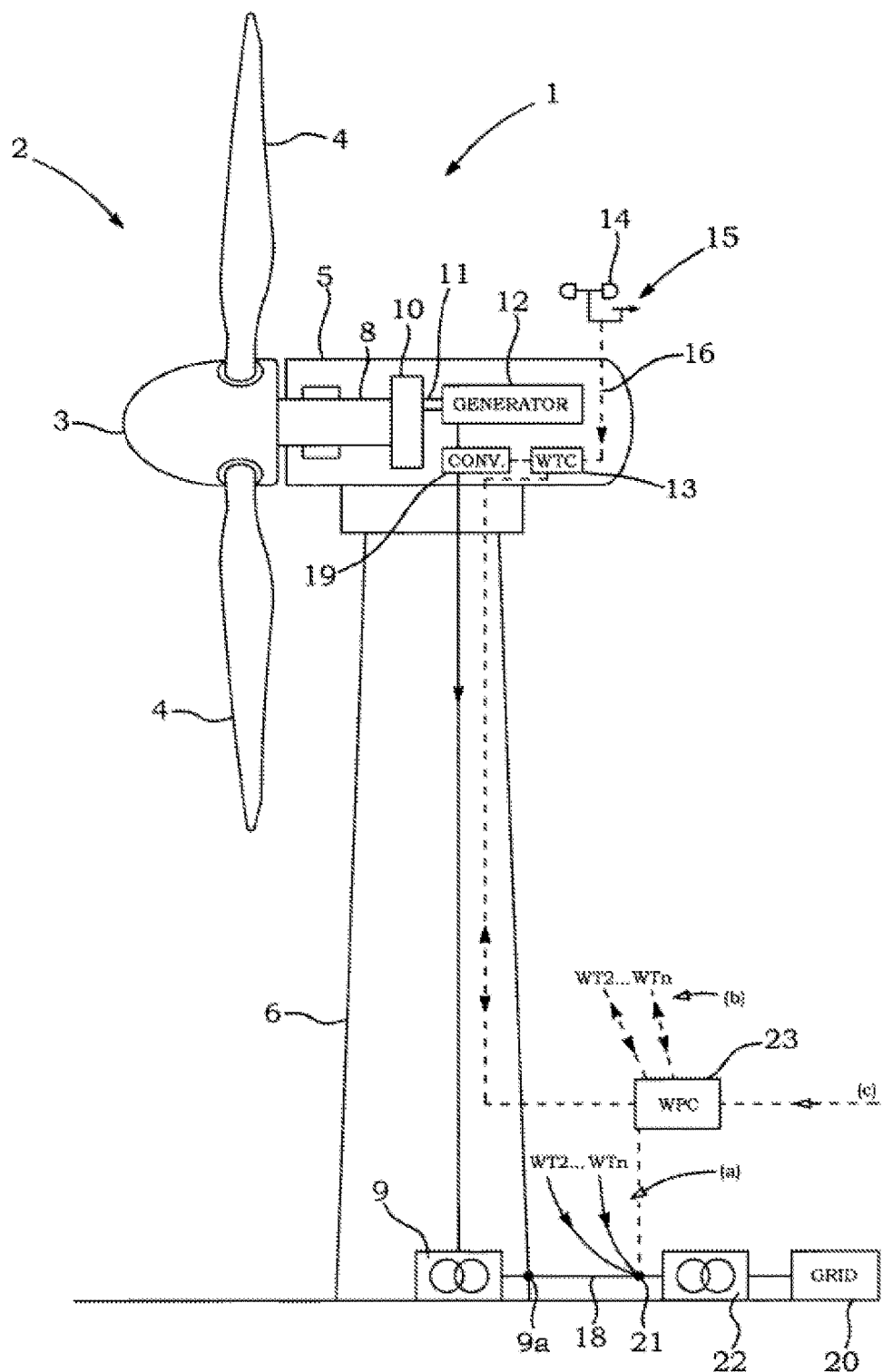
FIG. 1 shows a general structure of a wind turbine.

FIG. 1 shows, an exemplary variable-speed wind turbine generator (WPS) 1 is one of a plurality of wind turbine generators of a wind power plant (WPP) 2. It has a rotor 3 with a hub to which, e.g., three blades 4 are mounted. The pitch angle of the rotor blades 4 is variable by means of pitch actuators. The rotor 3 is supported by a nacelle 5 and drives a generator 12 via a main shaft 8, a gearbox 10, and a high speed shaft 11. This structure is exemplary; other embodiments, for example, use a direct-drive 15 generator.

The generator 12 (e.g. Induction or synchronous generator) produces electrical output power of a frequency related to the rotation speed of the rotor 3, which is converted to grid frequency (e.g. about 50 or 60 Hz) by a converter 19. The voltage of the electric power thus produced is up-transformed by a transformer 9. The output of the transformer 9 is the wind turbine generator's terminals 9a. The electric power from the wind turbine generator 1 and from the other wind turbine generators of the wind power plant 2 is fed into a wind power plant grid 18 (symbolized by "a" in FIG. 1). The wind power plant grid 18 is connected at a point of common coupling 21 and an optional further step up transformer 22 to a wind power plant external electrical utility grid 20. The grid 20 is equipped with regulation capacity against grid-frequency fluctuations, e.g. in the form of conventional producers which can increase and lower production on a short-time scale to control frequency.

A control system includes a wind turbine controller 13 and a wind power plant controller 23. The wind turbine controller 13 controls operation of the individual wind turbine generator 1, e.g. selects the full-load or partial-load operation mode, depending i.e. on the current wind speed, causes, in the partial load mode, operation of the wind turbine generator at the optimal working point by adjusting the blade angle and controlling the tip speed ration to the aerodynamic optimum at the current wind speed, and controls the converter 19 to produce electricity according to prescriptions of the wind-park-controller, e.g. an instruction to provide a certain amount of reactive power in addition to the active power, etc. The wind turbine controller 13 uses different input signals to perform its control tasks, for example signals representing current wind conditions (e.g. from an anemometer 14 and a wind vane 15), feed-back signals representing pitch angle, rotor position, amplitudes and phases of the voltage and current at the generator 12 and the terminals 9a, etc., and command signals from the wind power plant controller 23. The wind power plant controller 23 receives signals representative of the voltage, current and frequency at the point of common coupling 21 (parameters which may be considered to represent the voltage, current and frequency in the utility grid 20) and, optionally, receives information or command signals from the utility-grid provider (at "c" in FIG. 1). Based on some of these (and, optionally, further) input parameters the wind power plant controller 23 monitors grid stability and, upon detection of a reduction of grid stability, commands the wind turbine controllers 13 of the wind turbine generator 1 and the other wind turbine generators of the wind power plant 2 (at "b" in FIG. 1) to change operation by limiting fluctuations of the output power supplied. Upon receipt of such a command the wind turbine controller 13, upon increase of the wind speed, cuts the high-output peak which would then be produced in normal partial-load operation with maximum efficiency, e.g., by adjusting the blade-pitch angle towards the flag position, to comply with the wind-park controller's limit-fluctuation command. Thus, in the exemplary embodiment of FIG. 1 the control task of the control system to limit output fluctuations is shared by the wind power plant controller 23 and the wind turbine controller 13. In other embodiments this control task is performed by the wind turbine controller 13 alone; in those embodiments, the "control system" is represented just by the wind turbine controller 13, without a wind power plant controller. All the electrical power generated by the individual wind turbines generators in the wind farm are consolidated and supplied to the power grid via a Point of Common Coupling (PCC) 21.

Figure 2:
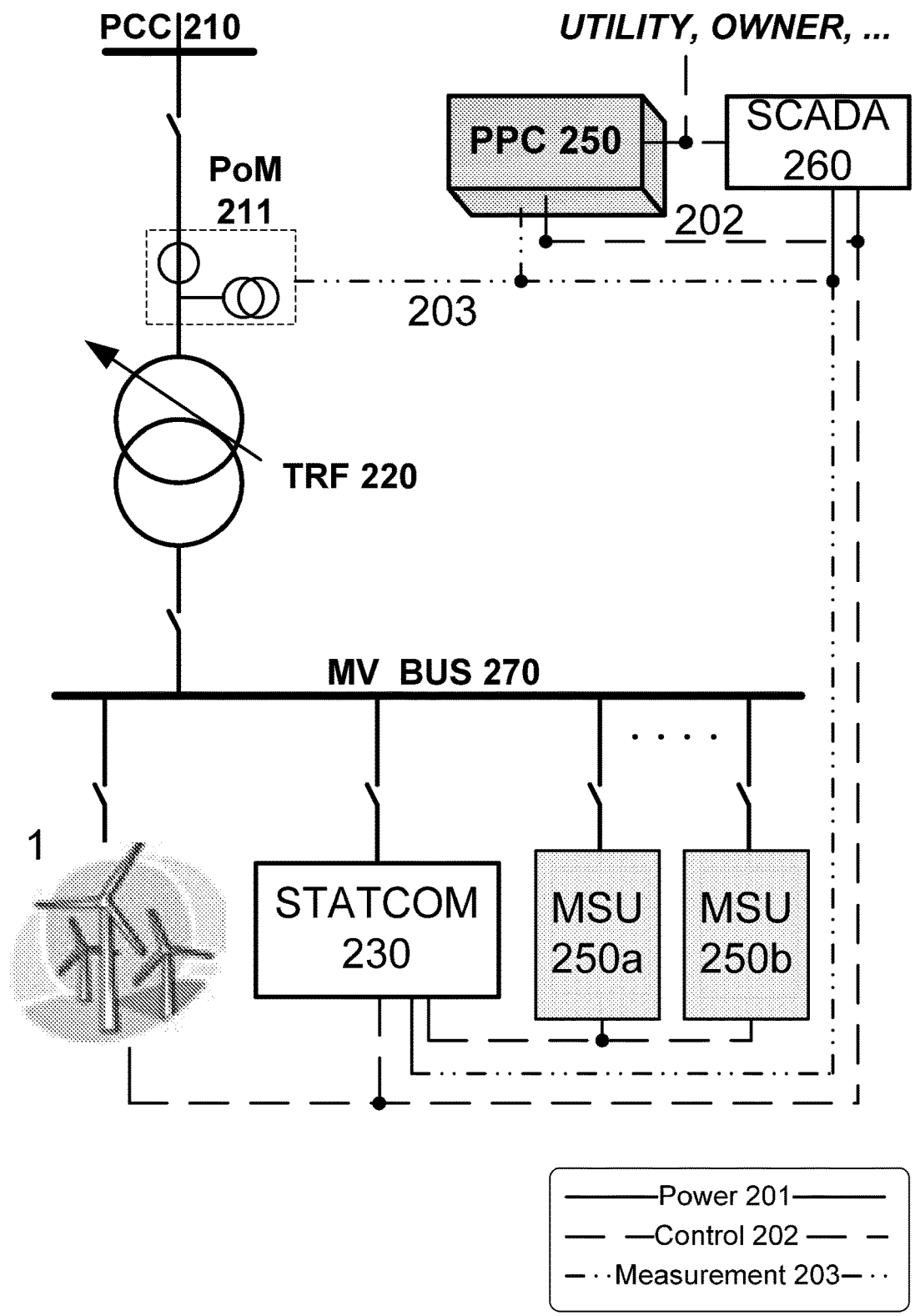
FIG. 2 shows a wind power plant according to the present invention.

FIG. 2 shows the relevant communication/control links 202 and measurement signals 203. The PPC 250 objective is to fulfil the grid code requirement at the PCC 210 regarding plant electrical performance. Therefore the PoM 211 for three-phase voltages and currents coincides in most of the cases with the PCC 210, unless there are very long distances between the PCC and the location of the PPC 250. The PCC 210 placement can also vary according to the specific project requirements.

The PPC, as the main controller of the WPP, takes care of the power control loops, such as voltage, reactive power and frequency controls by using the reference targets sent by, for instance, the grid operator. The PPC 250 further dispatches the active power and reactive power references to the turbines and the reactive power references to the turbines and the additional reactive power compensation equipment.

The Power Plant Controller (PPC) 250 is based on a programmable automation controller. A communication protocol is integrated with the PPC, targeting the WTGs within the power plant. The main control signals transmitted via the protocol are the active and reactive power setpoints, the available active and reactive power and status signals of the turbines.

A power meter (not shown in the Figures) is usually located in the PPC or can be remotely connected by a dedicated fast-optical fibre communication channel. Apart from some filtering functions, the power meter calculates the rms values of the feedback signals received from the sensors (PoM) 211. In addition, the power meter can record grid events, such as faults.

The invention relates to different types of events or abnormalities. Here two examples of types of abnormality are explained, i.e. how they are monitored and how different level of warning and alarm are raised based on frequency of occurrence.

For the implementation of the present invention different alarm levels are used depending on how the signal has exceeded the condition.

For the first time the measurement exceeds the limit a warning is a flag warning flag. After more events is a second warning flag raised. For the situation with oscillations or flicker here a flicker warning raised.

Table 1 shows the warning/alarm scheme in relation to the different types of events or abnormalities can be managed in an embodiment.

TABLE 1

| Case | Abnormality | First Warning | Repeat Warning | Alarm |
|---|---|---|---|---|
| 1 | Filtered value out of margin | WARNING1 | WARNING2 | ALARM |
| 2 | Instantaneous value out of margin | WARNING1 | WARNING2 | ALARM |
| 3 | Instantaneous value is oscillating | NA | NA | ALARM |

The abnormal cases are defined for an example as below:
Filtered signal values are out of margin For the reactive power supervision the follow equations apply, where QmeasLPF means that the Qmeas error is filtered through a low pass filter, LPF.

These signals are calculated internally in a digital or the LPF is implemented in the measurement hardware.

$Q_{measLPF}$–$Q_{meas}$ filtered with a time constant equal to $T\_rise$ $V_{measLPF}$–$V_{meas}$ filtered with a time constant equal to $T\_rise$ These are filtered signal calculated using a LPF.

$Q_{measLPF} < Q_{ref} - Q\text{deadbandLower} - Q\text{Margin}$, $Q_{measLPF} > Q_{ref} + Q\text{deadbandUpper} + Q\text{Margin}$ Although the reactive power can be supervised all time it only makes sense to do so, when the power plant controller is in PF-Q-Voltage slope control. This applies to any kind of reactive power signal supervision.

In an embodiment the Qref used in the equations above is the reactive power reference after the reactive power reference is limited by user defined limits, such as power factor limits and reactive power limits.

In another embodiment the Qref is used without taking the user defined limits into account.

For the voltage supervision the follow equations apply, where VmeasLPF means that the Vmeas error is filtered through a low pass filter $V_{measLPF} < V_{ref} - V\text{deadBand} - V_{meas}\text{Margin}$, $V_{measLPF} > V_{ref} + V\text{deadBand} + V_{meas}\text{Margin}$ Voltage supervision is only performed when the power plant controller is in Voltage control mode, although it can be applied in order modes.

Similar as for the filtered signal values, a supervision of the instantaneous values is performed and whenever the signals are out of margin warnings and/or alarms are raised.

$Q_{meas} < Q_{ref} - Q\text{deadbandLower} - Q_{meas}\text{Margin}$, $Q_{meas} > Q_{ref} + Q\text{deadbandUpper} + Q_{meas}\text{Margin}$ $V_{meas} < V_{ref} - V\text{deadBand} - V_{meas}\text{Margin}$, $V_{meas} > V_{ref} + V\text{deadBand} + V_{meas}\text{Margin}$ For both the reactive power and the voltage situation applies that the supervised signals or the error has to be within deadband and a margin, the sum of the deadband and the margin can be seen as a threshold value.

The deadband are set by the user, and typically they indicate the range close to the reference where the control should not reacts.

This applies to all the deadband mentioned in the equations above.

If deadband is set to 0.1%, then if the error is below 0.1% the controller will not react.

In an embodiment there is a First Warning (flag). The first Warning (flag) is set or raised when a measurement is of bound, a timer (Event timer) with a predefined duration of time is started at this occurrence.

The Event timer is the Period when the supervision is triggered and out of margin is actively monitored. If the number of times the measurement value is out of margin during this period exceeds a predetermined counter (Limit value) an alarm is triggered and action is taken in the PPC.

Limit value is a counter that set the maximum number of times the measurement value is out of margin and deadband before an alarm is triggered and action is taken In an embodiment the Event timer is set at 300 seconds.

In an embodiment the Event timer is user defined in a range of 1 to 3000 seconds In an embodiment there is a Repeat Warning that is triggered every times the event counter is incremented again within the Event timer.

In an embodiment there is an Alarm (second warning flag) which is triggered when the event counter exceeds the Limit value within the time period of the Event timer or the value stay in out of margin condition until the Event timer has expired.

If a new event does not occur again within the Event timer, the timer is reset and the event count and first and second warning flags are cleared.

In an embodiment the Limit value is set at the number three.

In an embodiment the Limit value is user selected in a range of 1 to 10.

In an embodiment there is a predefined Margin (310, 320) for reactive power measurements, Qmeas error (Filtered or instantaneous) when compared against the reactive power reference, Qref.

In an embodiment the Margin for Qmeas error is set at 0.05 p.u.

In an embodiment the Margin for Qmeas error is set in a range of 0.01 p.u. to 0.15 p.u.

In an embodiment there is a predefined Margin (310, 320) for voltage measurements, Vmeas error (Filtered or instantaneous) when compared against the Voltage reference, Vref.

In an embodiment the Margin for Vmeas error is set at 0.05 p.u.

In an embodiment the Margin for Vmeas error is set in a range of 0.01 p.u. to 0.15 p.u.

In an embodiment there is a value to monitor, the value set minimum percentage of online WTG or WTGs in an operational mode (defined as a ratio between Running WTG and Activated WTG) to use supervision.

In an embodiment the minimum percentage online is set at 95% of the wind turbine generators in the wind power plant. The value can be selected between 0% to 100%, although it is more difficult to monitor the reactive power and voltage signal at lower percentages as there are less power in the grid an the system will be more sensitive to perturbations.

As the deadbands and the margin are the same for the filtered values as for instantaneous values it is clear that the instantaneous signals are more likely to trigger a Warning signal, since the high frequency transients are filtered out in the filtered signals.

It is important to monitor instantaneous value to detect oscillating/flickering behaviour.

Flicker is detected when the measurement value is toggling between negative and positive event multiple times (3 times) within a short period of predetermined (2 s).

Negative event: Qmeas<QmeasMin
Positive event: Qmeas>QmeasMax
Negative event: Vmeas<VmeasMin
Positive event: Vmeas>VmeasMax The Flicker Window is a moving window for detecting the flicking events.

In an embodiment the flicker window is set by the user in a range of 1 to 5 seconds. Preferably the flicker window is in a range of 1 to 3 second.

There is a limit for flicker events during the window of detection. When exceeded, a flicker warning alarm will be raised.

In an embodiment the flicker alarm is set by the user in a range of 1 to 5 events.

In an embodiment there are a set of flags to keep track of which features are enabled, there is:
- a flag to enable/disable the overall supervision feature; and
- a flag to Disable/Enable supervision of filtered measurement out of margin event. This only applies when supervision is enabled; and finally,
- a flag to Disable/Enable supervision of instantaneous measurement out of margin and flicker event. This only applies when supervision is enabled.

The flicker counter counts the changes of the signal being above and below ranges.

If "flicker counter" is bigger than a predefined value during timer period, then you should raise a new alarm: "oscillations/noise detected".

In an embodiment the predefined value "counter of sign"-limit is set to 3.

In an embodiment the predefined value "counter of sign"-limit is set to a range of 2 to 10.

Figure 3:
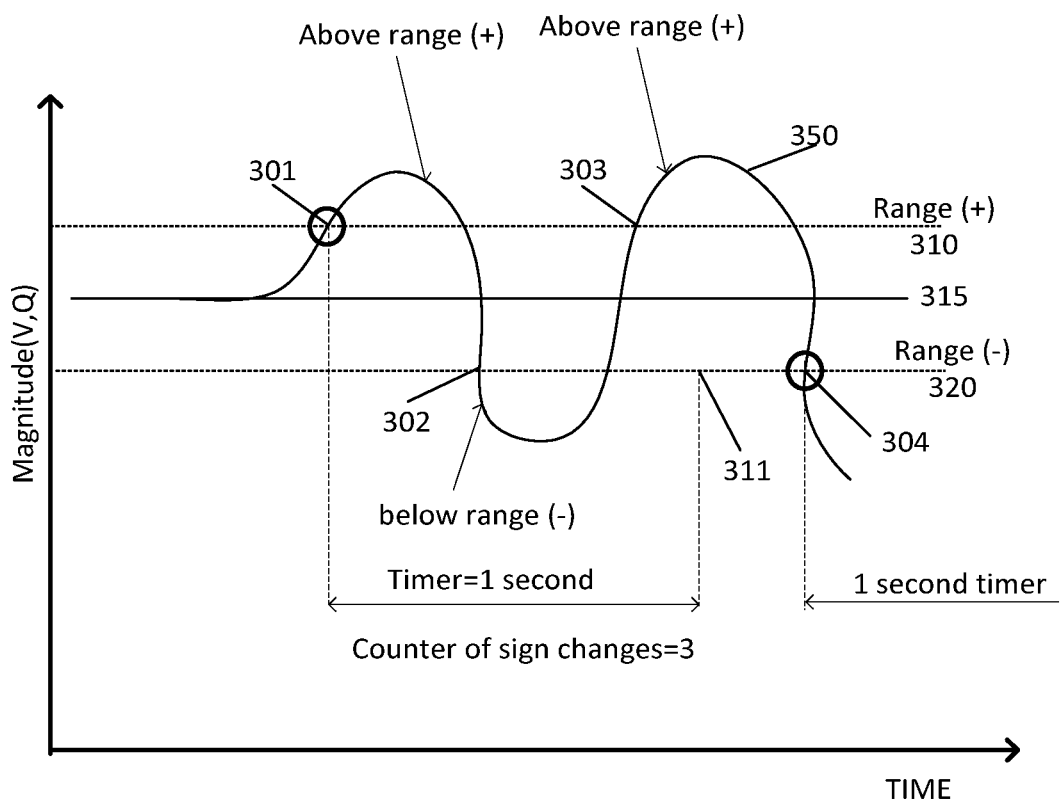
FIG. 3 shows a time trace of a measurement with oscillations.

FIG. 3 shows a Flicker situation with a time trace of a measurement 350 (could be voltage or reactive power), the reference signal 315 is in the example in steady state. The flicker window starts 301 as soon as the signals go out of the upper range, Range (+) 310. The timer is sin the Figure is set at 1 second and thus it ends. The first event 301 also starts the flicker counter and increments it to 1, the next event 302 is when the signal goes below the lower range, Range (−) 320, and the flicker counter is incremented to 2, the third event 303 happens as the signals go out of the upper range, Range (+) 310, and the flicker counter is incremented to 3. The timer expires at 311, for this example the flicker counter has already reached the limit value, therefore the flicker warning flag should be raised. A new event 304 starts a new timer.

Figure 4:
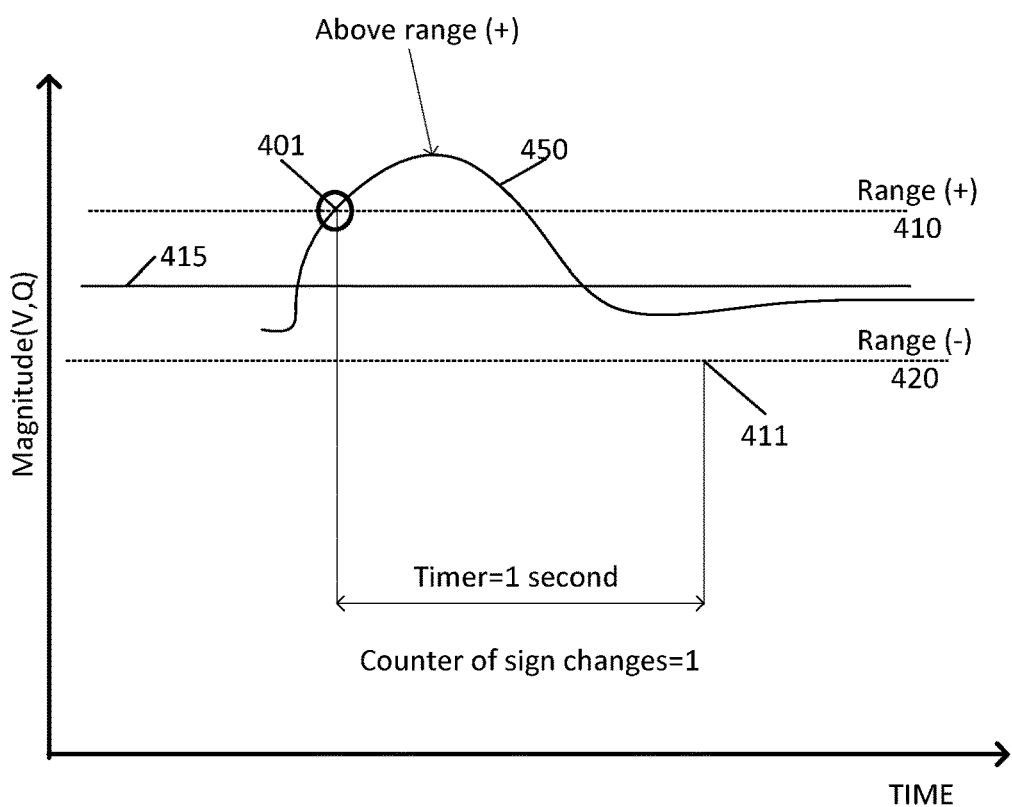
FIG. 4 shows a time trace of a measurement.

FIG. 4 shows an example with another measurement signal 450 (could be voltage or reactive power); the reference signal 415 is in the example in steady state. The event counter is initialized when the measurement signal 450 goes outside of the upper range, Range(+) 410 at the time 401, simultaneously the event timer is started, here it is set at 1 second, which expires at time 411, the measurement has settled with the range defined by Range(+) 410 and Range (−) 420.

A number of internal signals are used to operate the supervision. These signals are used internally for testing and not exposed to user. They are initialized to an appropriate value and can be changed dynamically at run time.

In an embodiment of the present invention the certain predefined events may disable the supervision.

Some of the conditions to disable supervision are listed below, the list may not be complete, and other events would be obvious for the skilled person.

The supervision should be stopped when any of these conditions are true.

During bumpless transfer.
 Bumpless transfer is when the power plant controller switch from one operational mode to another, here a system is implemented to reduce transients in the control system.
LVRT is activated
 LVRT means low voltage ride through, here the voltage level at PCC make deep voltage drops in a shorter or a longer period of time, the WPP is designed to withstand these events, but as the recovery is very transient, the supervision is stopped.
Actual percentage of WTGs online<minimum percentage online
 When too few turbines are connected.
STATCOM is configured but not online
 Here the PPC may expect grid support from the STATCOM, but as it is offline, the performance is not as expected.

Once these conditions are cleared, the supervision will be restarted with user defined delay after a stop condition to avoid unnecessary stop and restart when the operational conditions are changing too frequently.

Other events may benefit from a supervision Hold Off period, where the supervision is temporary disabled.

The supervision should be delayed during reference change and the control response period to avoid false alarm.

Changes in reactive power is in the following named DQ i.e. delta Q.

To hold off the supervision, as soon as the filtered or measurement is outside the delta Q levels, and before issuing an alarm:

For the instantaneous measurement the hold off timer is implemented as follows:

A hold off timer should be started with as a minimum, at similar time as the time response of the controller. In this case the DQ should use as follows:

$$\text{Timer value } (s) = \left[ -\frac{\ln(DQ')}{2.235 \times Trise^{-1.017}} \right]$$

When the timer is finished then checks if the signal is outside the DQ to generate the alarm. If the measurement returns to inside the DQ levels during the hold off period, the timer is reset and hold off is cancelled.

A variable is used as a protection for calculated hold off timer value. The hold off timer equation will produce negative value for x>1 in the LN(x). When invalid timer value is produced, the minimum is used.

For the filtered measurement the hold off timer is implemented as follows:

A hold off timer should be started including the filter response. In this case the DQ should be used as follows:

$$\text{Timer value } (s) = [-\ln(0.428 \times DQ') \times Trise]$$

Where $$DQ' = \frac{DQ_{user}}{\text{ABS}((Qref_k - Qref_{k-1}) - ((Qm_k - Qm_{k-1}))}$$

For the Voltage signals the situation is very similar, replacing DQ with DV in the formula above, where $$DV' = \frac{DV_{user}}{\text{ABS}((Vref_k - Vref_{k-1}) - ((Vm_k - Vm_{k-1}))}$$

Where
$Qref_k$ is the Qref at current sample, and
$Qref_{k-1}$ is the Qref at previous sample $Qm_k$ is the Qmeas at current sample, and $Qm_{k-1}$ is the Qmeas at previous sample The same applies for the voltage samples.

When the timer has expired, the signals are checked whether they are outside the DQ to generate the alarm. If the filtered measurement returns inside the DQ levels during the hold off period, the timer is reset and hold off is cancelled.

In an embodiment of the present invention an additional safety margin is applied by multiplying a factor 1.1 to the timer here called HoldFactor. The timer value is multiplied by a factor of 1.1 just to be in the safe side (since the equations above are calculated for $1^{st}$ order systems).

In another embodiment the HoldFactor is in a range of 0.5 to 5.

Figure 5:
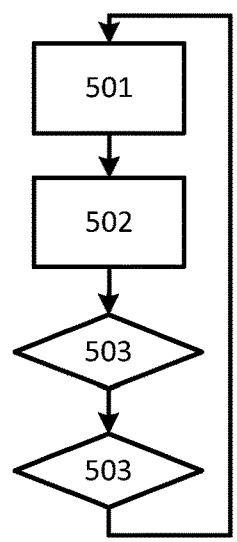
FIG. 5 shows a flow chart according to the method of the invention.

FIG. 5 shows a flow-chart of a method according to the invention for supervision of an electrical measurement in a wind power plant, with a plurality of wind turbine generators, the method comprises. Step 501 is measuring a measurement of an electrical parameter in the wind power plant; step 502 is determining a difference between the measurement and a reference value; step 503, in case the difference is greater than a threshold value, incrementing an event counter; step 504, in case the event counter is incremented, raising a first warning flag. The method shown in FIG. 5 may be carried out in a power plant controller.

In summary the invention relates to, a method for supervision of an electrical measurement in a wind power plant, with a plurality of wind turbine generators, the method comprises, a) measuring a measurement of an electrical parameter 311 in the wind power plant, b) determining a difference between the measurement and a reference value, c) in case the difference is greater than a threshold value, incrementing an event counter, d) in case the event counter is incremented, raising a first warning flag. The invention also relates to a power plant controller 250 arranged to supervise a wind power plant according to the method; the wind power plant comprises a plurality of wind turbine generators.

According to aspects of the present invention, there is provided at least one computer program product directly loadable into the internal memory of at least one digital computer, comprising software code portions for performing the steps of the method according to any of the embodiments herein disclosed, when said at least one product is/are run on said at least one computer.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refer to one or more of those items.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

What is claimed is:

1. A computer implemented method for supervision of an electrical parameter in a wind power plant, the wind power plant comprising a plurality of wind turbine generators, the method comprising:
    a) measuring the electrical parameter in the wind power plant;
    b) determining a difference between the measurement parameter and a reference value, using a power plant controller;
    c) determining the difference is greater than a threshold value, using the power plant controller, and in response incrementing an event counter;
    d) upon incrementing the event counter, raising a first warning flag using the power plant controller;
    e) determining a delta change in the measurement compared with the measurement of a previous sample, using the power plant controller;
    f) setting a duration for temporarily disabling the supervision in accordance with the delta change, using the power plant controller; and
    g) disabling the supervision for the duration, using the power plant controller.

2. The method according to claim 1, wherein the method further comprises:
    upon incrementing the event counter, starting an event timer with a predetermined duration of time;
    repeating the steps a), b), c) and d) once every predefined sample period of time;
    determining the event counter is greater than a predetermined limit value, and in response raising a second warning flag; and
    resetting the event counter when the event timer expirers.

3. The method according to claim 1, wherein the method further comprises:
    h) determining a sign of the difference;
    i) determining the difference is greater than a threshold value and the sign of a previous difference has toggled from negative to positive or from positive to negative, and in response incrementing a flicker counter;
    j) upon incrementing the flicker counter, starting a flicker window with a second predetermined duration of time;
    k) repeating the steps a) to d) and h) to j) once every predefined sample period of time;
    l) determining the flicker counter is greater than a predetermined limit value, and in response raising a flicker warning flag; and
    m) resetting the flicker counter when the flicker window expires.

4. The method according to claim 1, wherein the electrical parameter is a voltage or reactive power.

5. The method according to claim 1, wherein the measurement is an instantaneous value of the electrical parameter.

6. The method according to claim 1, wherein the method further comprises:
    low pass filtering the measurement of the electrical parameter, so as the measurement is a filtered value of the electrical parameter.

7. The method according to claim 1, wherein the threshold value is selected as a combination of a deadband and a margin.

8. The method according to claim 1, wherein the supervision is temporarily disabled in accordance with a predefined event.

9. The method according to claim 1, wherein the supervision is temporarily disabled in accordance with a predefined event.

10. The method according to claim 9, wherein the predefined event is a situation where a percentage of the plurality of wind turbine generators in an operating mode is below a predetermined percentage.

11. The method according to claim 1, wherein the method further comprises:
in case a first warning, second warning flag or a flicker warning flag is raised, change a control configuration and/or settings of a power plant controller controlling the plurality of wind turbine generators.

12. At least one computer program product directly loadable into the internal memory of at least one digital computer, comprising software code portions for performing an operation when said software code is run on said at least one computer, the operation comprising:
   a) measuring the electrical parameter in the wind power plant;
   b) determining a difference between the measurement parameter and a reference value;
   c) determining the difference is greater than a threshold value, and in response incrementing an event counter;
   d) upon incrementing the event counter, raising a first warning flag;
   e) determining a delta change in the measurement compared with the measurement of a previous sample;
   f) setting a duration for temporarily disabling the supervision in accordance with the delta change; and
   g) disabling the supervision for the duration.

13. A power plant controller arranged to supervise a wind power plant, the wind power plant comprising a plurality of wind turbine generators, wherein the power plant controller is arranged to:
   measure an electrical parameter in the wind power plant;
   determine a difference between the measured electrical parameter and a reference value;
   determine that the difference exceeds a threshold value, and in response increment an event counter;
   raise a first warning flag in response to the event counter being incremented;
   determine a delta change in the measurement compared with the measurement of a previous sample;
   set a duration for temporarily disabling the supervision in accordance with the delta change; and
   disable the supervision for the duration.

14. The computer program product according to claim 12, wherein the operation further comprises:
   upon incrementing the event counter, starting an event timer with a predetermined duration of time;
   repeating the steps a), b), c) and d) once every predefined sample period of time;
   determining the event counter is greater than a predetermined limit value, and in response raising a second warning flag; and
   resetting the event counter when the event timer expirers.

15. The computer program product according to claim 12, wherein the operation further comprises:
   h) determining a sign of the difference;
   i) determining the difference is greater than a threshold value and the sign of a previous difference has toggled from negative to positive or from positive to negative, and in response incrementing a flicker counter;
   j) upon incrementing the flicker counter, starting a flicker window with a second predetermined duration of time;
   k) repeating the steps a) to d) and h) to j) once every predefined sample period of time;
   l) determining the flicker counter is greater than a predetermined limit value, and in response raising a flicker warning flag; and
   m) resetting the flicker counter when the flicker window expires.

16. The computer program product according to claim 12, wherein the electrical parameter is a voltage or reactive power.

17. The computer program product according to claim 12, wherein the method further comprises:
   low pass filtering the measurement of the electrical parameter, so as the measurement is a filtered value of the electrical parameter.

18. The computer program product according to claim 12, wherein the threshold value is selected as a combination of a deadband and a margin.

19. The computer implemented method of claim 1, wherein the measured electrical parameter is used in a control loop for the wind power plant.

* * * * *